(12) United States Patent
Bonnier et al.

(10) Patent No.: US 9,764,907 B2
(45) Date of Patent: Sep. 19, 2017

(54) MACHINE AND METHOD FOR CONVEYING ITEMS

(71) Applicant: AUTOMATISATION ET RENOVATION DU CONDITIONNEMENT DANS LES INDUSTRIES LAITIERES ARCIL, Puiseux Pontoise (FR)

(72) Inventors: Christophe Bonnier, Saint-Brice-sous-Foret (FR); Xavier Henry, Gazeran (FR); Laurent Dandy, Conflans Sainte Honorine (FR)

(73) Assignee: AUTOMATISATION ET RENOVATION DU CONDITIONNEMENT DANS LES INDUSTRIES LAITIERES ARCIL, Puiseux Pontoise (FR)

( * ) Notice: Subject to any disclaimer, the term of this patent is extended or adjusted under 35 U.S.C. 154(b) by 0 days.

(21) Appl. No.: 15/042,337

(22) Filed: Feb. 12, 2016

(65) Prior Publication Data

US 2016/0244272 A1 Aug. 25, 2016

(30) Foreign Application Priority Data

Feb. 20, 2015 (FR) ..................... 15 51481

(51) Int. Cl.
*B65G 47/90* (2006.01)
*B65G 47/08* (2006.01)
*B65G 47/06* (2006.01)

(52) U.S. Cl.
CPC ........... *B65G 47/90* (2013.01); *B65G 47/088* (2013.01); *B65G 47/901* (2013.01); *B65G 47/06* (2013.01)

(58) Field of Classification Search
CPC ........ B65G 15/12; B65G 25/02; B65G 47/06; B65G 47/088; B65G 47/90; B65G 47/901
See application file for complete search history.

(56) References Cited

U.S. PATENT DOCUMENTS

| | | | |
|---|---|---|---|
| 4,191,003 A | 3/1980 | Talarico | |
| 4,457,121 A * | 7/1984 | Johnson | B65B 21/16 53/247 |

(Continued)

FOREIGN PATENT DOCUMENTS

| | | |
|---|---|---|
| EP | 174 344 A1 | 1/2002 |
| FR | 2 631 604 A1 | 11/1989 |

(Continued)

OTHER PUBLICATIONS

French Preliminary Search Report, dated Jan. 12, 2016, from corresponding French Application.

*Primary Examiner* — Gene Crawford
*Assistant Examiner* — Keith R Campbell
(74) *Attorney, Agent, or Firm* — Young & Thompson

(57) ABSTRACT

Machine and method for conveying items in a production line, wherein there is an incoming batch of separate items on or in an incoming batch carrier, the plurality of items of the incoming batch are moved in a perpendicular vertical direction, while keeping the items immovable relative to the incoming batch carrier in the horizontal plane, the captured items are brought directly above a horizontal conveyor belt having a horizontal movement in a direction of travel in the horizontal plane, a horizontal movement of the items is adjusted and synchronized with the movement speed of the conveyor belt, the items are moved in the vertical direction in order to bring the items to rest on the conveyor belt while maintaining the horizontal movement of the items synchronized with the movement speed of the conveyor belt, then (Continued)

the items are discharged in a batch of outgoing items by the conveyor belt.

35 Claims, 10 Drawing Sheets

(56) References Cited

U.S. PATENT DOCUMENTS

| | | | | |
|---|---|---|---|---|
| 6,328,153 | B1 * | 12/2001 | Manghi | B65G 47/086 |
| | | | | 198/468.11 |
| 6,554,124 | B2 * | 4/2003 | Colamussi | B65B 35/36 |
| | | | | 198/418.6 |
| 7,467,504 | B2 * | 12/2008 | Mate | B65B 35/38 |
| | | | | 206/432 |

FOREIGN PATENT DOCUMENTS

FR       2 673 611 A1    9/1992
FR       2 792 920 A1    11/2000

* cited by examiner

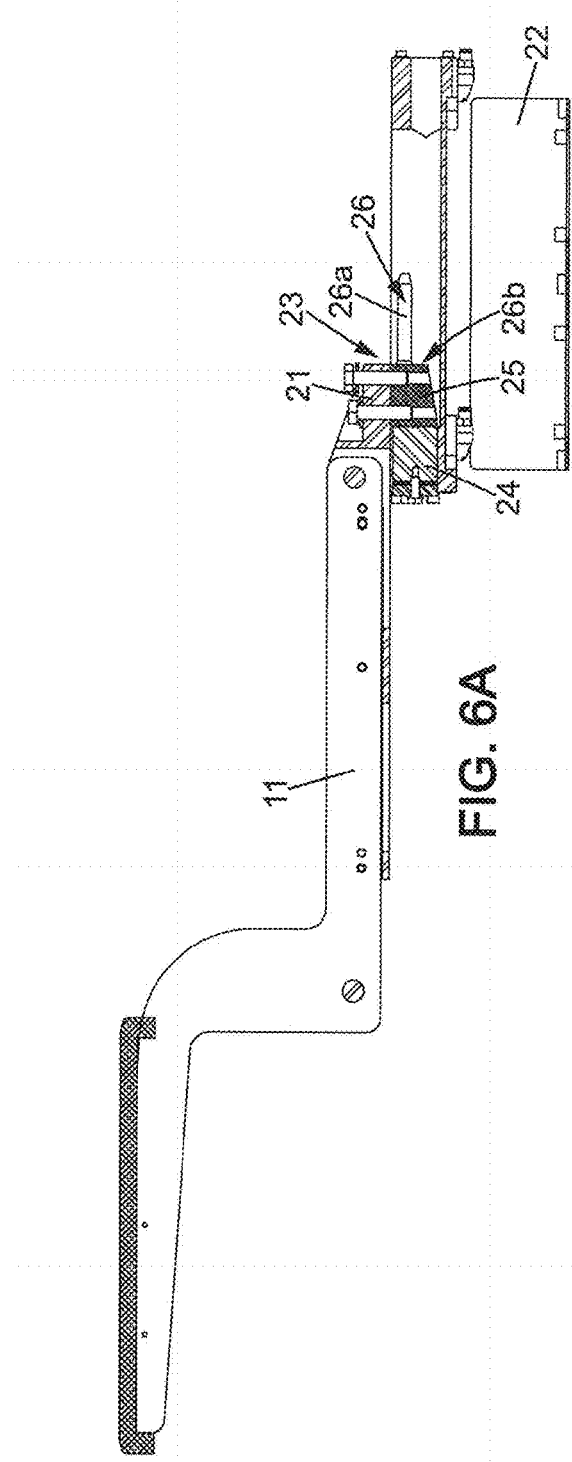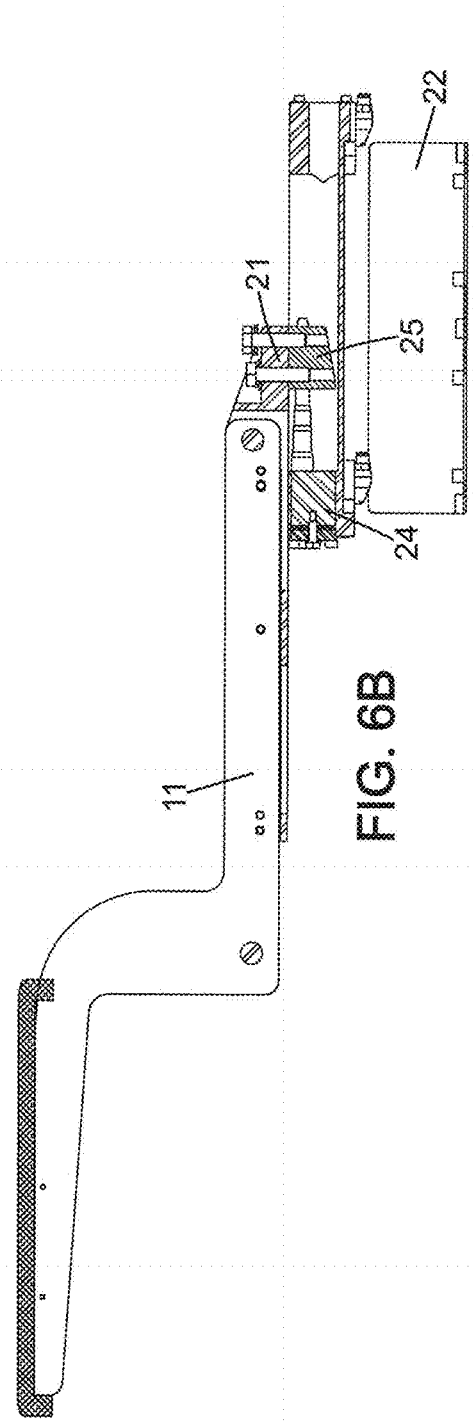

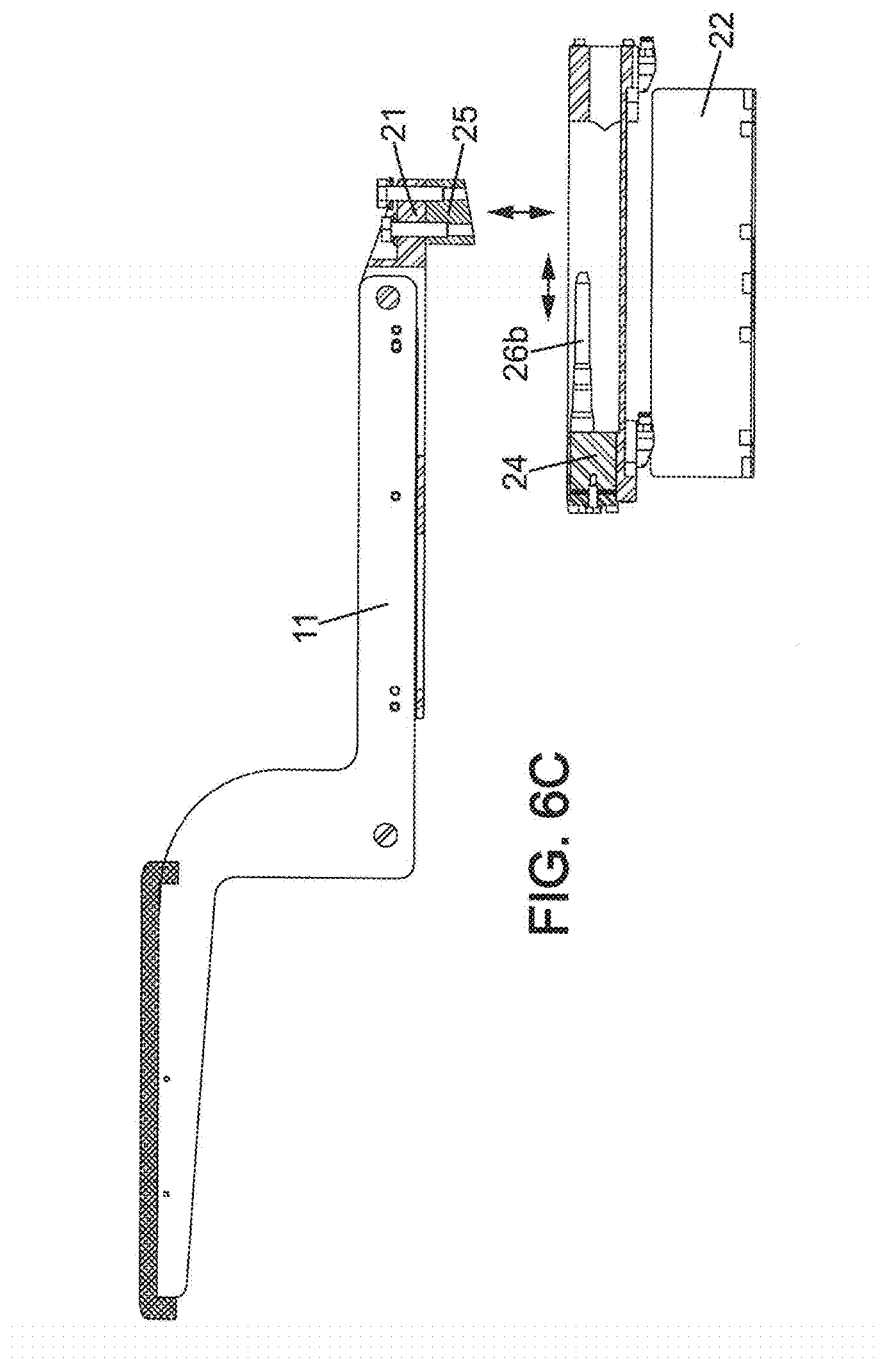

MACHINE AND METHOD FOR CONVEYING ITEMS

FIELD OF THE INVENTION

The invention relates to the conveying of items, particularly in a production line.

BACKGROUND OF THE INVENTION

The invention applies in particular to the case of pots such as a typical pot made of plastic, waxed cardboard, or the like, and intended to be closed by a lid. The term "pot" should be understood in the broad sense as including actual pots, but also tubs, cups, or other similar forms of primary packaging. The items may be in the form of single pots or individual multipacks comprising multiple pots side by side and attached to each other while being arranged in columns and/or rows with frangible lines or areas of lower resistance between them. For example, a multipack may comprise two pots, or four pots arranged in two rows each containing two pots, or six pots in two rows each containing three pots, etc.

As detailed below, the invention applies to the case of separate multipacks but finds particular application to the case of items in the form of single pots, meaning individually separate and not attached in multipacks, said single pots being filled or not filled with content and closed or not closed by lids.

Such an item typically contains or is typically intended to contain a content, homogeneous or not homogeneous, having a general state that is more or less fluid, possibly containing more or less solid pieces. Such content is, for example, a milk product or a dessert, this list not being exhaustive.

For example, the invention finds particular application in the production of fresh milk products including those of very short shelf-life, such as yoghurts and the like, puddings, ice creams and the like, but also cheese products, compotes, etc. The invention also applies in the production of products of different types and/or destinations but which can be regarded as similar in terms of their conveyance in the production chain.

For the production of such products, a content to be packaged is made available or produced, pots and lids that are individual or arranged in multipacks are made available or produced, and individual wrapping blanks are made available or produced. Then the products themselves are made, meaning that the pots are filled with the desired content or contents and then the pots are closed by placing the lids. Then batches or packs are formed and if they include several pots, they are grouped together, for example stacked. Next, a wrapping blank is optionally placed around each pot, batch, or pack, which is folded and closed on itself. Then the items are boxed when appropriate.

Conveying machines enable the transport of items, meaning products at various stages of their production, between each of these operations. Items of a production line are understood to mean products at various stages of their production, including empty pots, filled pots, pots filled and closed, or pots filled and closed and wrapped.

Such a conveying machine comprises an infeed for an incoming batch of separate items, arranged on or in an incoming batch carrier, and an outfeed for items in a batch of outgoing items.

There are known conveying machines comprising a conveyor belt on which the items are advanced, the conveyor belt moving the items from one station to the next station. Such conveying devices have the disadvantage, during the conveying, of losing the information on the relative position and relative orientation of the items.

This information is essential in many cases for the later processing of the items, for example for sealing the pots, aligning the decoration, assembling into a batch or pack, wrapping or even boxing the items. It then becomes necessary to implement position and orientation sensing means and repositioning and/or reorienting means downstream of such conveying machines, which is complex and expensive.

Here, the term "information on the relative position" is understood to mean a knowledge of the position of an item relative to adjacent items and/or relative to a general reference system. In particular, it means information on the position of said item in a horizontal plane of the conveying machine, in particular a plane of general movement of the items to be conveyed.

The term "information on the relative orientation" is understood to mean a knowledge of the orientation of an item relative to adjacent items and/or relative to a general reference system. In particular, it means information on the orientation of said item on a vertical axis perpendicular to said horizontal plane of the conveying machine.

Also known are so-called "walking beam" conveyors, which are used to move items step by step while retaining at least some of the information on the relative position of the items, and possibly also on the relative orientation of the items, as indicated above. Such conveyors usually have a succession of bars mounted on camshafts, which by successively lifting the items allow them to advance, step by step, along the conveyor. Such "walking beam" conveyors have the disadvantage of being expensive, as they are composed of a large number of parts having synchronized movements, and are usually limited to the conveyance of individual pots.

FR 2,673,611 describes a conveyor following a rectangular cycle, taking items from a production station and placing said items on a conveyor belt. Because of the uncontrolled contact between the items and the conveyor belt, the items may bounce or pivot during placement. Here again, it is necessary to provide means for repositioning the items downstream of the conveying machine.

The problem underlying the invention is therefore to provide a method and a conveying machine which make it possible to save information on the relative position and the relative orientation of items during their conveyance so as to allow downstream processing of the items without preliminary repositioning. The invention also aims to provide such a method and such a conveying machine that are inexpensive and easily adaptable.

SUMMARY OF THE INVENTION

To this end, and according to a first aspect, the invention relates to a method for conveying items in a production line, wherein, an incoming batch of items is provided, comprising a plurality of separate items arranged on or in an incoming batch carrier such that they are aligned in a horizontal plane into one or more longitudinal rows and/or one or more transverse rows, the plurality of items in the batch are simultaneously all moved with respect to the incoming batch carrier in a vertical direction perpendicular to the horizontal plane, while keeping the items immovable relative to the incoming batch carrier in the horizontal plane, so that the items are no longer in contact with the incoming batch carrier and are free to be moved in the horizontal plane without touching the incoming batch carrier, the captured items are brought to directly above a horizontal conveyor belt, the items being vertically distanced from said conveyor belt by a predefined vertical spacing, then, the items are all simultaneously moved in the vertical direction, bringing the items to rest on the conveyor belt, and the items are carried away as a batch of outgoing items, by means of the conveyor belt.

According to one characteristic of this method:

when the items are brought to directly above the conveyor belt, the conveyor belt is moving in a direction of travel in the horizontal plane at a movement speed, the captured items being directly above the conveyor belt, a horizontal displacement of the items is adjusted and synchronized with said movement speed of the conveyor belt, and the items are moved in the vertical direction to bring the items to rest on the conveyor belt while keeping the horizontal movement of the items synchronized with the movement speed of the conveyor belt.

In one embodiment, the items in the incoming batch are arranged on or in the incoming batch carrier in longitudinal columns that are regularly aligned so as to present a predefined transverse pitch along a transverse direction in the horizontal plane, and so as to be spaced apart from each other along said transverse direction by transverse gripping spaces.

In one embodiment, in order to move the plurality of items in the incoming batch, all simultaneously in the vertical direction, longitudinal fingers of a robotic comb are introduced into the transverse gripping spaces of the incoming batch, said longitudinal fingers being regularly aligned so as to have said predefined transverse pitch, and being arranged so that two adjacent longitudinal fingers are able to surround transversely the items of a longitudinal column of items of the incoming batch and to hold the items of said longitudinal column so as to capture them and carry them to directly above the conveyor belt.

In one embodiment, the items comprise at least one lower extension portion and one upper portion, the transverse dimension of the upper portion being greater than the transverse dimension of the lower extension portion, and, in order to move the items of the incoming batch in a vertical direction, the upper portion is brought into contact with the lower portion from below as the lower portion is surrounded transversely.

In one embodiment, the items are of the type comprising a body with a bottom wall, a side wall closed on itself, and a top closure, as well as a flange near the top closure, said body constituting the lower extension portion and said flange forming the upper portion.

In one embodiment, contact only occurs with the items from below, in a vertical direction.

In one embodiment, in order to move the items of the incoming batch in a vertical direction, a robotic comb is raised vertically relative to the horizontal incoming batch carrier while keeping the robotic comb horizontal, so as to come into contact with the items of the incoming batch and lift them from the incoming batch carrier.

In one embodiment, in order to move the items of the incoming batch in a vertical direction, the incoming batch carrier in or on which are arranged the items is vertically lowered with respect to a horizontal robotic comb, while keeping said incoming batch carrier horizontal, such that the items of the incoming batch come to rest on the robotic comb.

In one embodiment, in order to move the items of the incoming batch in a vertical direction, a robotic comb and/or the incoming batch carrier is moved so that the robotic comb and the incoming batch carrier have a vertical relative velocity of less than 200 millimeters per second when contact occurs between the robotic comb and the items of the incoming batch.

In one embodiment, a robotic comb is moved, along an active path segment for carrying items to be directly above the conveyor belt, at a first movement speed in the horizontal plane, and along an inactive return path segment in which the robotic comb does not perform any item conveying function, at a second movement speed in the horizontal plane that is greater than the first speed.

In one embodiment, in order to move items in the vertical direction so as to place them on the conveyor belt, a robotic comb is lowered vertically, relative to the fixed conveyor belt, in a manner that places the items on the conveyor belt.

In one embodiment, in order to place the items on the conveyor belt, the robotic comb is lowered vertically relative to the conveyor belt along a vertical distance that is greater than the predefined vertical spacing, such that the items lose contact with the robotic comb at the end of said vertical distance.

In one embodiment, in order to carry the items away as a batch of outgoing items by means of the conveyor belt, the items are guided on the conveyor belt in the direction of travel in the horizontal plane, in particular by means of longitudinal fingers of a robotic comb transversely surrounding the items.

In one embodiment, a robotic comb is moved only in the vertical direction and in a horizontal direction, the horizontal direction being in particular the direction of travel of the conveyor belt.

In one embodiment, when the captured items are being carried to directly above the conveyor belt, at least one physical characteristic of the captured items is measured.

In one embodiment, the presence or absence of defective items among the captured items is determined based on the measured physical characteristic, and if the presence of defective items among the captured items is determined, the captured items are eliminated.

In one embodiment, the items of the batch of outgoing items have, in the horizontal plane, the same relative orientations and the same relative positions as the items of the incoming batch.

In one embodiment, when a horizontal movement of the items is adjusted and synchronized to the movement speed of the conveyor belt, a horizontal position of the items of the batch of outgoing items is defined with respect to the conveyor belt, in particular a horizontal position in the direction of travel of the conveyor belt.

In one embodiment, when the captured items are brought to be directly above a horizontal conveyor belt, said items are vertically offset from any cutting waste from the items, so that said cutting waste from the items does not come into contact with the captured items.

In one embodiment, the steps of the method are repeated a plurality of times so as to ensure, on the conveyor belt, a stream of outgoing items containing rows of items transverse to the direction of travel of the conveyor belt, regularly spaced apart by a predefined longitudinal pitch, the items being arranged in one or more columns.

According to a second aspect, the invention relates to a machine for conveying items in a production line, for the implementation of the method as described above, which comprises:

upstream, an incoming batch carrier in or on which are arranged a plurality of separate items of a batch of incoming items such that they are aligned in a horizontal plane into one or more longitudinal columns and/or one or more transverse rows, downstream, a horizontal conveyor belt for carrying the items away as a batch of outgoing items, upstream, means for moving the plurality of items of the incoming batch all simultaneously in a vertical direction perpendicular to the horizontal plane, while keeping the items immovable relative to the incoming batch carrier in the horizontal plane, such that the items are no longer in contact with the incoming batch carrier and are free to be moved in the horizontal plane without touching the incoming batch carrier, downstream, means for bringing the captured items to be directly above the conveyor belt, the items being vertically distanced from said conveyor belt by a predefined vertical spacing, downstream, means for moving the items in a vertical direction all simultaneously, in order to bring the items to rest on the conveyor belt.

According to one characteristic of such a machine:

the conveyor belt has movement in a direction of travel in the horizontal plane at a movement speed, at least when items are brought to directly above the conveyor belt, the machine further comprises downstream means for adjusting and synchronizing, to the movement speed of the conveyor belt, a horizontal movement of the items brought to directly above the conveyor belt, and the means for moving items in the vertical direction to place the items on the conveyor belt are adapted to move said items in the vertical direction while keeping the horizontal movement of the items synchronized with the movement speed of the conveyor belt.

In one embodiment, the means for bringing the captured items to be directly above the conveyor belt comprise a robotic comb and movement means for the robotic comb.

In one embodiment, the robotic comb is provided with longitudinal fingers regularly aligned so as to provide a predefined transverse pitch along a transverse direction in the horizontal plane perpendicular to the direction of travel of the conveyor belt, and arranged such that two adjacent longitudinal fingers are able to surround transversely the items of a longitudinal column of items of the incoming batch and to support the items of said longitudinal column so as to capture them and bring them to directly above the conveyor belt.

In one embodiment, the incoming batch carrier comprises a plurality of regularly aligned longitudinal grooves with a predefined transverse pitch along a transverse direction in the horizontal plane perpendicular to the direction of travel of the conveyor belt, said longitudinal grooves being adapted to accommodate the longitudinal fingers of the robotic comb.

In one embodiment, the conveyor belt comprises a plurality of conveying strands that are synchronized and aligned with a predefined transverse pitch along the transverse direction perpendicular to the direction of travel of the conveyor belt, and spaced apart from each other along the transverse direction by transverse strand spaces suitable for accommodating the longitudinal fingers of the robotic comb.

In one embodiment, the longitudinal fingers of the robotic comb each have an upper face provided with a plurality of structures distributed longitudinally along the longitudinal fingers.

In one embodiment, the robotic comb comprises a frame on which the longitudinal fingers are mounted and a comb body integral with movement means, the comb body and frame being secured together by detachable assembly means.

In one embodiment, the detachable assembly means are magnetic assembly means comprising a first member mounted on the comb body and a second member mounted on the frame, the detachable assembly means being suitable for securing the frame to the comb body such that they can be separated when sufficient force is applied to overcome a predefined magnetic attraction force between the first member and the second member.

In one embodiment, the movement means comprise means for moving the robotic comb in a horizontal direction, controlled by means of adjustment and synchronization to the movement speed of the conveyor belt, said means comprising in particular a linear motor, for example in the form of a magnetic actuator.

In one embodiment, the movement means comprise means for moving the robotic comb in the vertical direction, able to move the robotic comb while keeping the longitudinal fingers of the robotic comb horizontal, said means comprising in particular an eccentric assembly.

In one embodiment, the machine further comprises means for measuring at least one physical characteristic of the captured items.

In one embodiment, the machine further comprises determination means able to determine the presence or absence of defective items among the captured items based on said physical characteristic of the captured items, and means of eliminating the defective items detected.

In one embodiment, the means of eliminating the defective items detected comprise a discharge outlet separating the conveyor belt from the incoming batch carrier, in the horizontal plane, the means of eliminating defective items detected being adapted to discharge into the discharge outlet the defective items among the captured items.

In one embodiment, the incoming batch carrier comprises a plurality of pot supports of a cutting tool of a production line.

In one embodiment, the plurality of structures is adapted to vertically offset the captured items from any cutting waste from the items, during a movement of the robotic comb.

In this manner, the method and the conveying machine retain information on the relative position and the relative orientation of the items during conveyance. It is thus possible to implement a wide variety of downstream processing of the items without preliminary repositioning, in particular sealing the items, aligning and placing decoration on the items, assembling the items into a batch or multi-pack, overwrapping the items. Moreover, this is achieved reliably with high machinability for fast speeds, with a production line which eliminates disadvantageous complexities. In addition, it is possible to measure physical characteristics of the items during their conveyance and to eliminate items determined to be defective according to said measured physical characteristics.

BRIEF DESCRIPTION OF THE DRAWINGS

The figures of the drawings are now briefly described.

We will now describe several embodiments of the invention with reference to the drawings, in which:

FIG. 6A is a sectional side view of the robotic comb of FIG. 5, illustrating the magnetic assembly means, FIG. 6B is a sectional side view of the robotic comb of FIG. 5, in particular when a force applied to the longitudinal fingers in the longitudinal direction is greater than a predefined magnetic attraction force between the first member and the second member of the magnetic assembly means, FIG. 6C is a sectional side view of the robotic comb of FIG. 5, in particular when the frame is detached from the comb body.

DETAILED DESCRIPTION OF THE INVENTION

Figure 1:
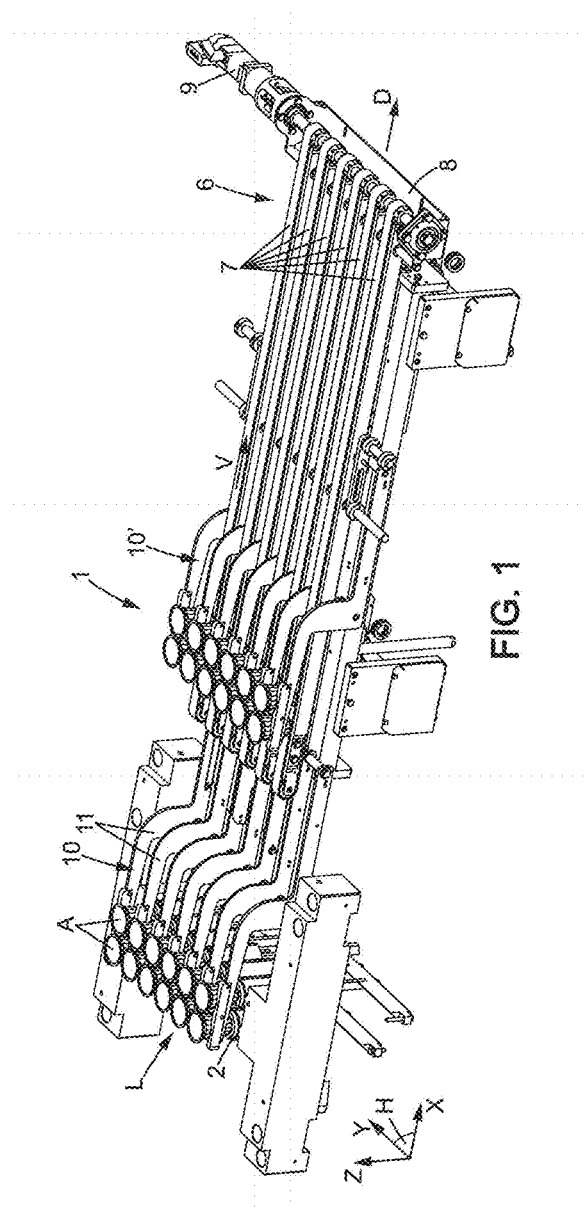
FIG. 1 is a partial general perspective view of a conveying machine according to one embodiment of the invention.

Below is a detailed account of several embodiments of the invention, accompanied by examples and with reference to the drawings.

The invention relates to the conveyance of items A between different processing stations of a production line. The items A are typically products at various stages in their production, having at least one primary packaging such as a pot of plastic, waxed cardboard, or the like, intended to be closed by a lid. The pots at various stages in their production are thus empty or filled with content, or filled with content and closed, or filled with content, closed, and overwrapped. This is all exemplary and non-limiting, and the term "item" by convention means a product in a production line at a stage in its production.

In one typical embodiment, the items A have a shape that is generally cylindrical or prismatic or pseudo-cylindrical or pseudo-prismatic or ovoid or the like, with an axis that is normally arranged vertically. In a typical embodiment, such an item A has an axial length of several centimeters.

The method can be implemented and the machine can function provided there is an incoming batch L of items A. Such an incoming batch L comprises a plurality of separate items A. In the present description, a batch of items, in particular an incoming batch L and an outgoing batch S, comprises at least one, preferably at least two, items A.

The items A of the incoming batch L may, for example, be in the form of single pots or individual multipacks comprising multiple pots side by side and attached to each other while being arranged in columns and/or rows with frangible lines or areas of lower resistance between them. A multipack may comprise two pots, or four pots arranged in two rows each containing two pots, or six pots in two rows each containing three pots, etc., these being provided only by way of illustration and not limitation. Preferably, the items A of the incoming batch L are in the form of single pots.

In particular, the method according to the invention may be implemented and the machine according to the invention may be arranged downstream, in particular immediately downstream or substantially immediately downstream, of a line or a unit for creating the items A (thermoforming and cutting the pots, and possibly filling and closing the pots).

The items A of the incoming batch L are arranged on or in an incoming batch carrier 2 so as to be aligned in a horizontal plane H into one or more longitudinal columns C and/or one or more transverse rows perpendicular to the longitudinal columns.

Downstream, a conveyor belt 6 carries away the items A in a batch of outgoing items S.

The method and machine according to the invention aim to ensure that the items A are also arranged on the conveyor belt so as to be aligned in a horizontal plane H into one or more longitudinal columns and/or one or more transverse rows. Specifically, the method and machine according to the invention aim to ensure that the items A of the batch of outgoing items S have, in the horizontal plane H, the same relative orientations and the same relative positions as the items of the incoming batch L.

Figure 2:
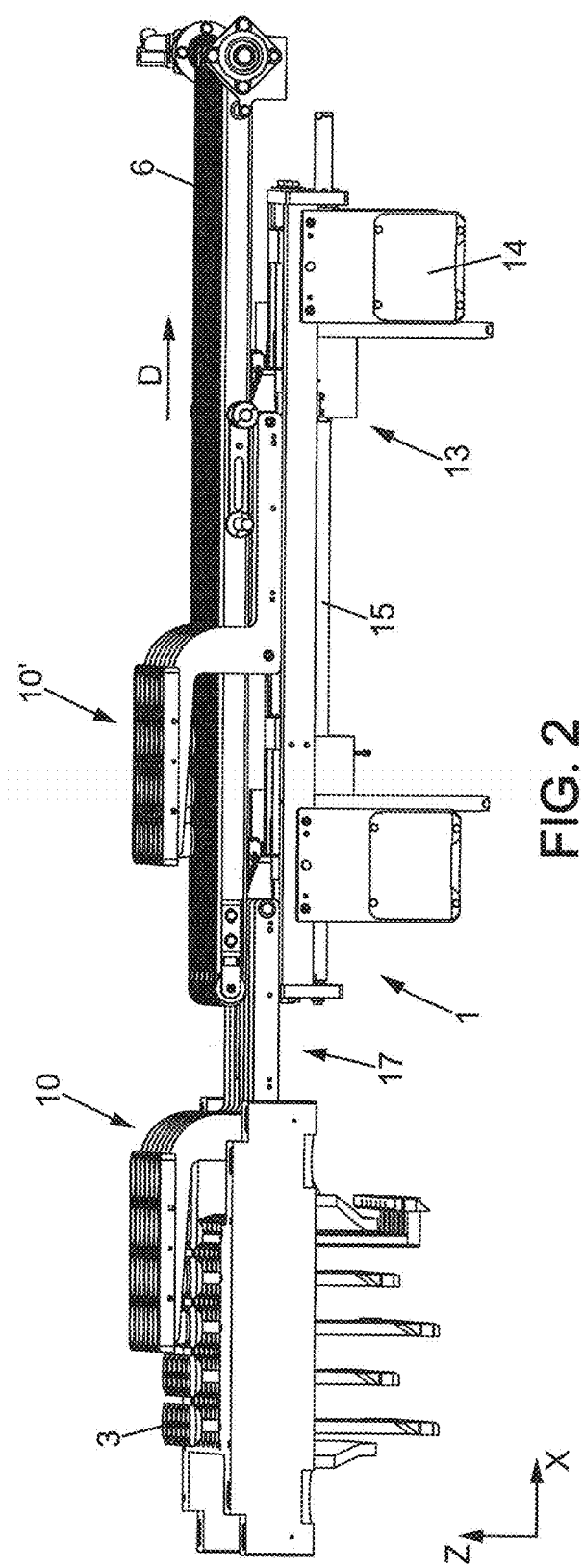
FIG. 2 is a side view of the machine of FIG. 1, illustrating in particular the robotic comb, its movement means, and the conveyor belt.
Figure 3:
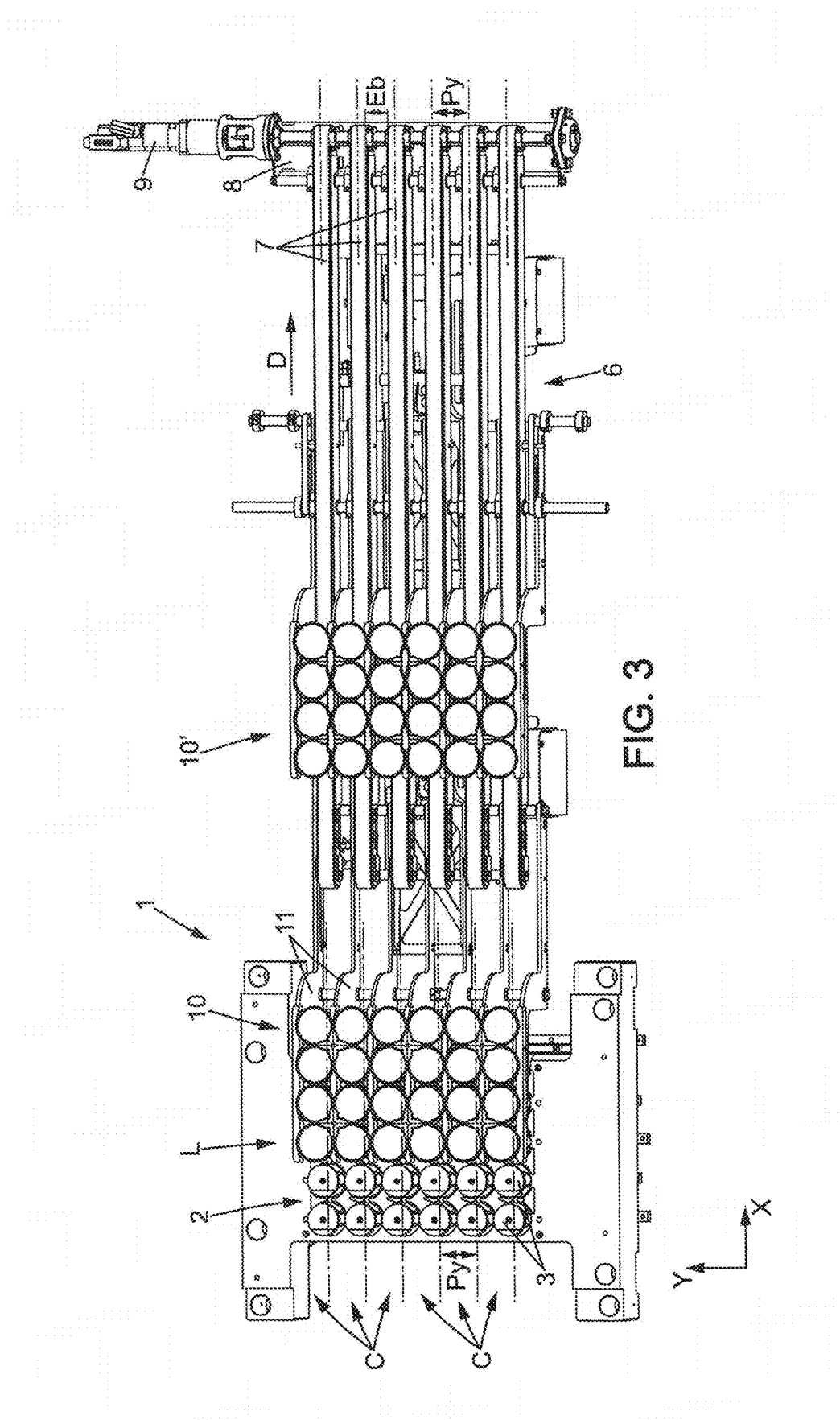
FIG. 3 is a top view of the machine of FIG. 1, illustrating in particular the items of an incoming batch, the robotic comb, and the conveyor belt.

First referring to FIGS. 1, 2, and 3, the machine 1 comprises a frame and appropriate support elements.

It extends horizontally in a generally horizontal plane H which is also a plane of the drive movement of the driving parts and members with which with the machine is provided, such as the conveyor belt or conveyor means described below. The machine 1 may in particular extend in a longitudinal direction X of the horizontal plane H which is a direction of flow of the items A conveyed and in particular of the stream of items of the outgoing batch S.

The conveying means, in particular the conveyor belt, and the stream of items A are thus moving along the longitudinal direction X in a given direction, thereby defining on the machine an upstream side (left side in FIGS. 1 and 2) and a downstream side (right side in FIGS. 1 and 2). In addition, a direction Y of the horizontal plane H perpendicular to the longitudinal direction X is termed "transverse".

Finally, a vertical direction Z is defined, perpendicular to the horizontal plane H and therefore perpendicular to the longitudinal direction X and transverse direction Y. The vertical direction Z is oriented in a given direction so as to define, for the elements of the machine 1 and the items A, an "above" and a "below". In the same manner, we define "lower" parts and "upper" parts for the elements of the machine 1 and the items A, in reference to the vertical direction Z and in the direction of orientation of said vertical direction Z.

As illustrated in FIGS. 1 to 3, upstream the machine 1 comprises an incoming batch carrier 2 on or in which are arranged a plurality of separate items A of an incoming batch L of items A. The incoming batch carrier 2 is placed at the exit or near the exit of a line or station for creating items A, partially visible in FIG. 1.

As illustrated in particular in FIG. 3, the items A of the incoming batch L are arranged on or in the incoming batch carrier 2, in regularly aligned longitudinal columns C so as to have a predefined transverse pitch Py along the transverse direction Y. The longitudinal columns C are spaced apart from each other along the transverse direction Y by transverse gripping spaces Ey.

Figure 8:
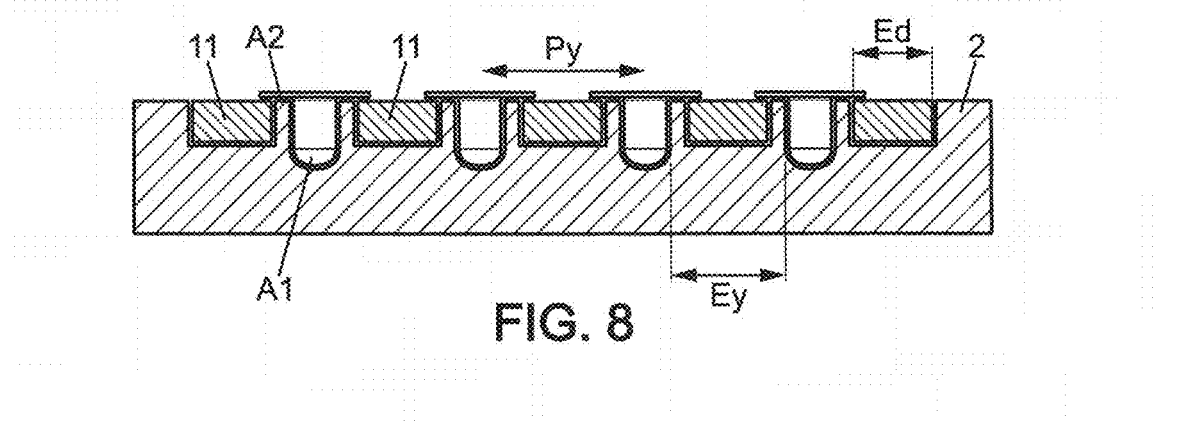
FIG. 8 is a front view in vertical section of the upstream portion of the machine, the longitudinal fingers of the robotic comb being accommodated in the longitudinal grooves of the incoming batch carrier, the items of the incoming batch being arranged in the incoming batch carrier.

The phrase "The longitudinal columns are spaced apart from each other along the transverse direction by transverse gripping spaces" is understood to mean at least a portion of the items in each longitudinal column is spaced apart from at least a portion of the items of a neighboring longitudinal column, along the transverse direction Y, by transverse gripping spaces Ey, illustrated in FIG. 8.

Thus, in particular, the items A may comprise at least a lower extension portion A1 and an upper portion A2 as can be seen in FIG. 8, the upper portion A2 being above the lower extension portion A1 along the vertical direction Z. The transverse dimension of the upper portion A2 is greater than the transverse dimension of the lower extension portion A1.

"Transverse dimension" of an element is understood to mean the maximum extension of said element along the transverse direction Y.

For example, the items A may be pots comprising a body constituting the lower extension portion A1, said body A1 having a bottom wall, a side wall closed on itself, and a top closure. The pots may comprise a flange, near the top closure, constituting the upper portion A2. Alternatively, the pots may have, for example, a conical shape with a lower extension portion A1 of a smaller diameter than an upper portion A2.

In this embodiment given for purely exemplary purposes, the transverse gripping spaces Ey between the longitudinal columns C are thus understood to be spaces between the lower extension portions A1 of the items in the longitudinal columns C.

Figure 4:
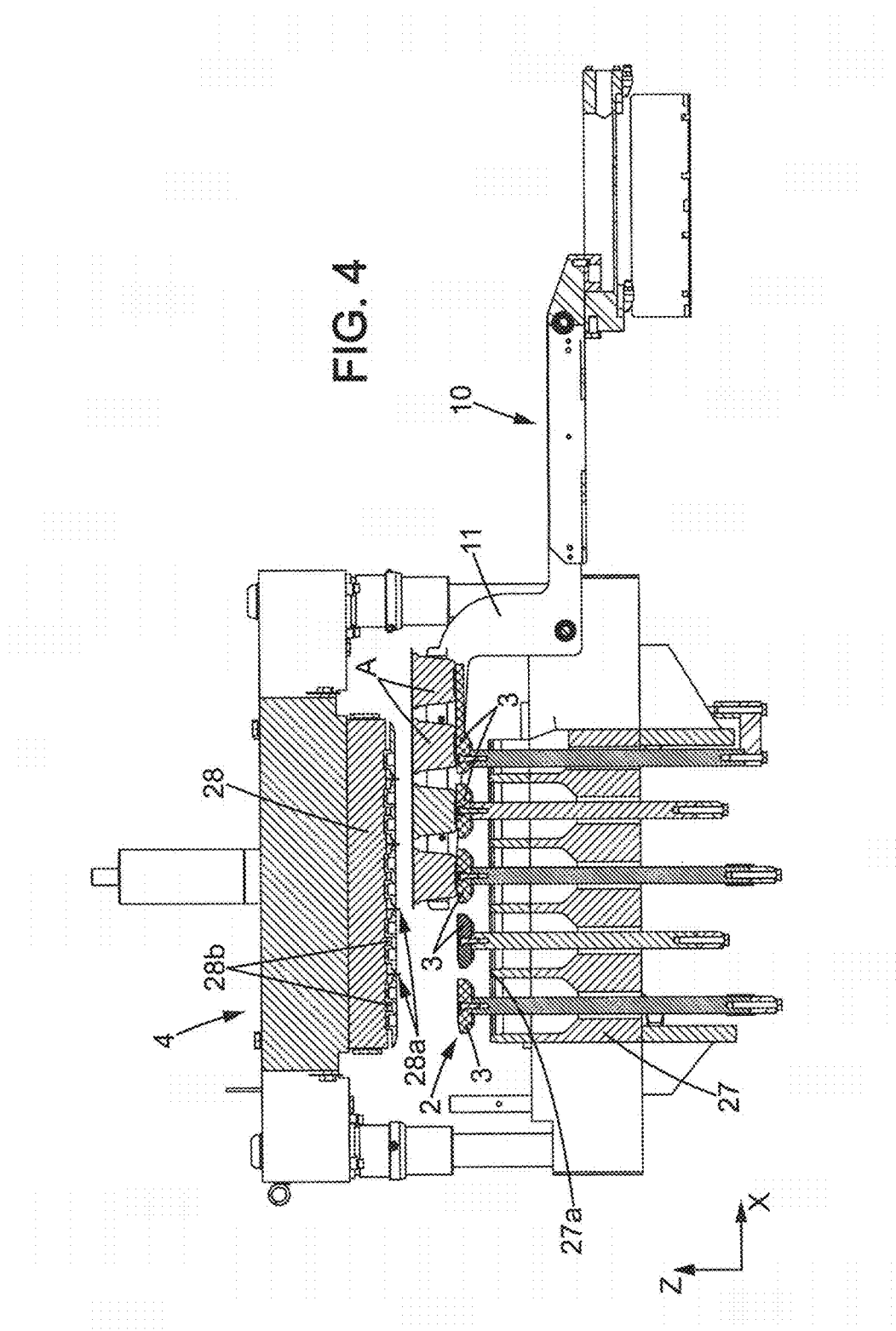
FIG. 4 is a partial detail sectional view of a cutting tool of a production line, accepting pot supports of a conveying machine according to one embodiment of the invention.
Figure 5:
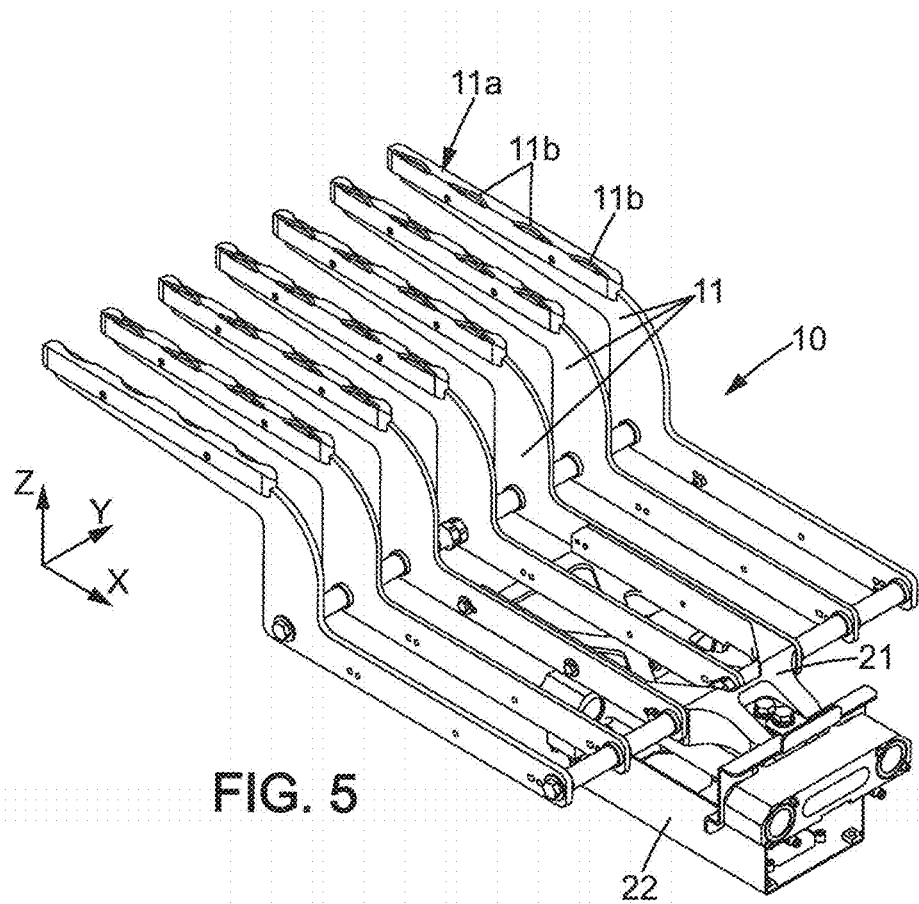
FIG. 5 is a partial perspective detail view of the robotic comb, illustrating in particular the longitudinal fingers of the comb.

In one embodiment illustrated in detail in FIG. 4, the incoming batch carrier 2 comprises a plurality of separated pot supports 3, in particular in the form of a plurality of trays on which are arranged the items A of the incoming batch, in particular thermoformed pots.

The pot supports 3 are components of a cutting tool 4 in a production line as shown in FIG. 4. The cutting tool 4 has a lower die 27 and an upper portion 28, each adapted to move along a vertical axis Z relative to the pot supports 3.

Thus, the upper portion 28 is adapted to descend relative to the pot supports 3, while the lower die 27 rises relative to the pot supports 3, until they imprison the items A carried by the pot supports 3 and linked together by the material of the thermoformed sheet from which the items A are formed, so that the items A of said sheet can be cut out and separated, leaving cutting waste.

For this purpose, the lower die 27 comprises for example a plurality of openings distributed in the horizontal plane and forming cavities suitable for receiving the pot supports 3 when the lower die 27 rises relative to the pot supports 3. The upper portion 28 of the cutting tool 4 carries blades 28a which are arranged to face grooves 27a formed in the lower die at the desired cutting locations, so that the material of the items A is sandwiched between the knives and the grooves, for cutting. The upper portion 28 may further comprise strippers 28b to facilitate removal of the items A after cutting.

In some embodiments, one among the lower die 27, the upper portion 28, and the pot supports 3 may for example be fixed, in particular the pot supports 3, while the others, specifically the lower die 27 and the upper portion 28, can move along the vertical axis.

The pot supports 3 may either be fixed or be driven in a downward vertical movement that moves the upper portion of the items A away from the upper portion 28 of the cutting tool 4, to facilitate gripping the items A with no risk of collision.

In this manner, the items A are moved away from the cutting waste such as the plastic cutout scrap and the upper portion 28 of the cutting tool.

When the pot supports 3 are movable, they are movable in such a way that the position and orientation of the items A are not changed.

In this embodiment, the pot supports 3 thus guarantee an arrangement in longitudinal columns L of items A of the incoming batch L, as detailed above.

Downstream, the conveying machine 1 comprises a conveyor belt 6 visible in FIGS. 1 to 3. The conveyor belt 6 lies in the horizontal plane H and moves in a direction of travel D in the horizontal plane H, for example parallel to the longitudinal direction X.

The movement of the conveyor belt 6 occurs at movement speed V along the longitudinal direction X.

The movement speed V of the conveyor belt 6 is known. The movement speed may be predefined and, in particular, constant. The movement speed V may also be adjusted, in other words not constant. In this case, the movement speed V is advantageously measured in real time by a sensor or by means of a motor driving the conveyor belt. The movement speed V of the conveyor belt 6 may in particular be adjusted to manage the spacing of items on the conveyor and/or to meet the constraints of upstream and/or downstream dependencies in the production line.

The term "movement" is understood to mean that said at least one conveying strand 7 is driven at a non-zero movement speed V for at least a portion of a period of operation of the conveying machine. In particular, as detailed below, it is understood to mean in particular that the conveyor belt is driven at a non-zero movement speed V at least when items A are brought to directly above said conveyor belt.

"Movement speed" is therefore understood to mean a linear velocity of said at least one conveying strand 7 of the conveyor belt, for example within the reference system of the fixed frame 8 of the conveyor belt 6.

The conveyor belt 6 comprises at least one conveying strand 7 mounted on a fixed frame 8 and driven by a drive motor 9. However, the conveyor belt 6 may advantageously comprise a plurality of synchronized conveying strands 7 as illustrated in FIG. 1, to accommodate a plurality of longitudinal columns of items A as detailed below.

"Synchronized" is understood to mean that the conveying strands 7 have the same direction of travel D and a same predefined movement speed V in the direction of travel D.

By extension, "movement speed of the conveyor belt" is understood to mean a speed of the conveying strand or strands 7 of the conveyor belt 6 with respect to the fixed frame 8.

Furthermore, the conveying machine 1 comprises a robotic comb 10 illustrated in FIGS. 1 to 4 and in detail in FIG. 5 and FIGS. 6A, 6B, 6C.

In FIGS. 1 to 3, the robotic comb 10 is shown in two different positions during operation of the conveying machine, identified by the references 10 and 10'. These two positions are detailed below.

The robotic comb 10 is provided with a plurality of longitudinal fingers 11 extending in the longitudinal direction X, for example from downstream to upstream of the conveying machine 1.

The longitudinal fingers 11 are fixedly assembled into a series of longitudinal fingers by a frame 21, so that they are securely attached and immovable relative to one another. The frame 21 is immovably fixed to a comb body 22 by detachable connection means 23. The comb body is integral with the rest of the conveying machine 1, and in particular is integral with movement means 13 for the robotic comb 10, as detailed below.

With the detachable assembly means 23, it is possible to separate the frame 21 supporting the longitudinal fingers 11 from the comb body 22, so that the series of longitudinal fingers 11 can easily be exchanged for another series that is new and/or of different configuration, without having to disassemble the conveying machine. This increases the flexibility of the machine when the same machine is used to convey items A of different sizes.

In one embodiment illustrated in FIGS. 6A, 6B, and 6C, the detachable assembly means 23 are magnetic assembly means. The frame 21 is attached to the comb body 22 in a manner that is detachable when sufficient force is applied to overcome a predefined magnetic attraction force. FIG. 6A illustrates the normal operation of the conveying machine 1, in which the frame 21 is fixed to the comb body 22.

The magnet assembly means comprises a first member 24 mounted on the comb body 22 and a second member 25 mounted on the chassis 21. The first member 24 and second member 25 are such that a magnetic attraction force can exist between them when they are in proximity to one another. For example, the first member 24 may comprise a magnet while the second member 25 comprises a ferrite, or vice-versa.

Said magnetic attraction force may be sufficiently strong to secure the frame 21 to the comb body 22 during normal operation, meaning when the forces exerted on the frame 21 and the comb body 22 are not too intense. The predefined magnetic attraction force can thus be calibrated by the choice of permanent magnet for the first member 24 and/or the second member 25, and by adjustment of an air gap between the first member 24 and second member 25, for example by means of peel-off shims.

Thus, as illustrated in FIG. 6C, it is possible to separate the frame 21 supporting the longitudinal fingers 11 from the comb body 22 by exerting sufficient force, so as to more easily exchange the series of longitudinal fingers 11 for another series that is new and/or of different configuration, without having to disassemble the conveying machine. Such an exchange is fast and simple and further enhances the flexibility of the machine when the same machine is used to convey items A of different sizes.

Moreover, in particular in case of an impact on the longitudinal fingers 11, the frame 21 carrying the longitudinal fingers 11 can separate from the comb body 22 without any parts breaking, by a simple separation of the first member 24 and second member 25, as shown FIG. 6B. This prevents damage to the conveying machine.

To strengthen the assembly of the frame 21 and the comb body 22, positioners 26 can be used to limit the relative movement of the frame 21 and the comb body 22 in the vertical direction when said frame 21 and said comb body 22 are in proximity to one another. In this manner, it is possible to prevent vertical movement of the robotic comb 10 in the cutting tool 4, which could be damaging to the cutting tool.

The positioners 26 comprise, for example, pins 26*a* extending from the comb body 22 for a certain distance and able to pass through holes 26*b* made in the frame 21. Thus, the pins 26*a* may be oriented in the longitudinal direction X as shown in FIG. 6A, and the frame 21 and the comb body 22 may be integrally secured by contact between the first member 24 and second member 25 in a plane perpendicular to the longitudinal direction X. The pins 26*a* have, for example, a length of at least 50 mm. The magnetic assembly means thus create a disengaging mechanism allowing linear movement of the frame 21 for example of about 100 mm along a horizontal axis X before being semi-released with guidance allowing greater play. In this manner, damage is prevented to the cutting tool when the robotic comb 10 is subjected to an impact.

The longitudinal fingers 11 are regularly aligned so as to have a predefined transverse pitch Py identical to the pitch Py of the items A arranged on or in the incoming batch carrier 2. The longitudinal fingers 11 advantageously have, on at least an active portion of said longitudinal fingers 11, a transverse finger dimension Ed that is less than the transverse gripping spaces Ey separating the longitudinal columns C so as to enable insertion of the fingers between the longitudinal columns C without touching the items A in said longitudinal columns C.

The robotic comb 10 is arranged so that two adjacent longitudinal fingers 11 are able to surround transversely the items A of a longitudinal column C and to hold the items A of said longitudinal column so as to capture them and carry them to directly above the conveyor belt 6.

Figure 7:
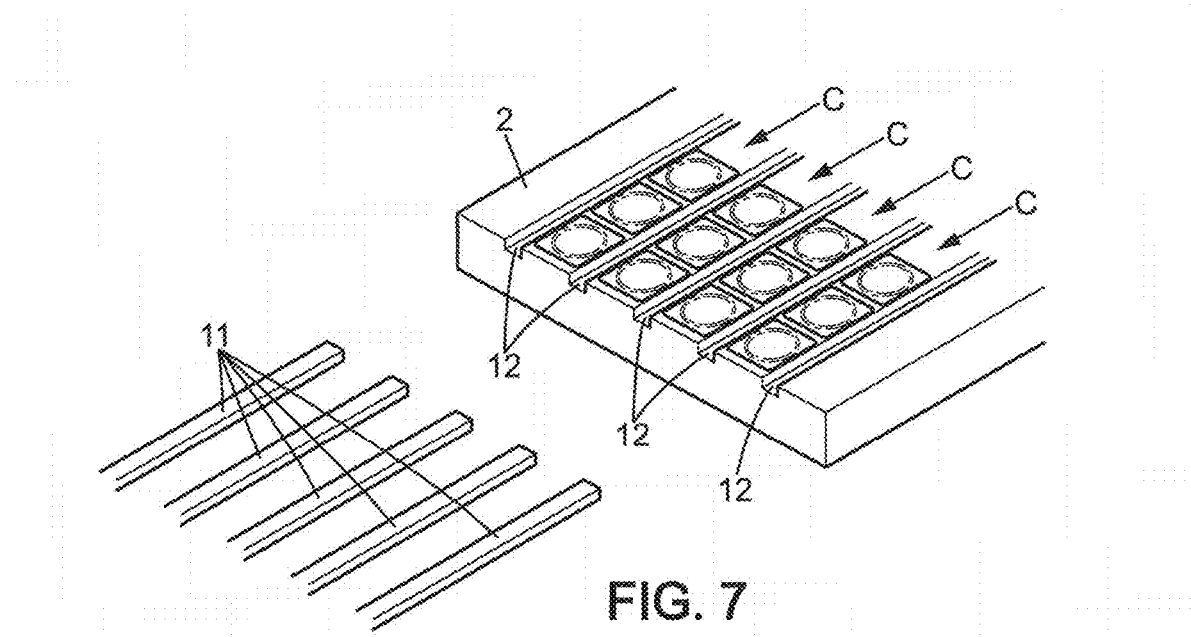
FIG. 7 is a perspective detail view of the upstream portion of the machine, illustrating the incoming batch carrier of the machine as well as an incoming batch of items.

We will now also refer to FIGS. 7 and 8, illustrating an embodiment where the incoming batch carrier 2 is formed as one piece.

The incoming batch carrier 2 comprises a plurality of longitudinal grooves 12, visible in FIG. 7 and FIG. 8. The longitudinal grooves 12 are regularly aligned at a predetermined transverse pitch Py, in the transverse direction Y, in particular identical to the transverse pitch of the items A placed on or in the incoming batch carrier 2.

As can be seen in FIG. 7 and FIG. 8, the longitudinal grooves 12 are sufficiently deep to accommodate the longitudinal fingers 11 of the robotic comb 10, when the items A of the incoming batch L are arranged on or in the incoming batch carrier 2, without said longitudinal fingers 11 coming into contact with the items A of the incoming batch L. In the embodiment of FIGS. 1 to 3, where the incoming batch carrier 2 comprises a plurality of pot supports 3, the grooves are formed in particular by the spaces between the pot supports.

For this, the machine 1 comprises movement means 13 for moving the robotic comb 10, and the longitudinal fingers 11, in the vertical direction Z and in a direction in the horizontal plane H, said direction in the horizontal plane H being in particular the direction of travel D of the conveyor belt, and more particularly the longitudinal direction X.

More specifically, the robotic comb 10 may for example be moved in the vertical direction Z and in the horizontal direction X and only those directions, while keeping the longitudinal fingers 11 horizontal and aligned in the horizontal plane H.

Thus, in a first path segment P1-P2 of the robotic comb 10, the longitudinal fingers 11 can be introduced into the longitudinal grooves 12 of the incoming batch carrier 2 so as to surround transversely the items A of the longitudinal columns C without said longitudinal fingers 11 coming into contact with the items A of the incoming batch L, as illustrated in FIG. 7 and FIG. 8.

At the end of the first path segment, at P2, the robotic comb is then in the position indicated by reference 10 in FIGS. 1 to 3.

Figure 12:
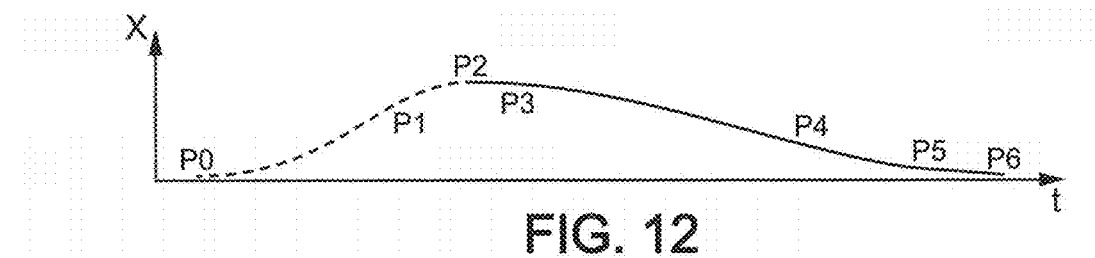
FIG. 12 is a graph illustrating the path of the robotic comb in the longitudinal direction during implementation off a method of the invention.
Figure 13:
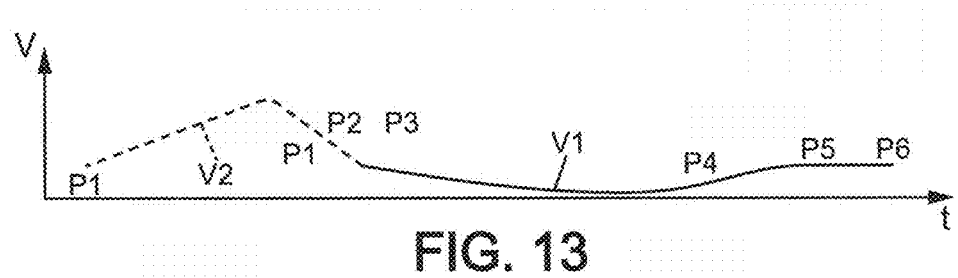
FIG. 13 is a graph illustrating the speed of the robotic comb in the longitudinal direction as the robotic comb follows its path during implementation of a method according to the invention.
Figure 14:
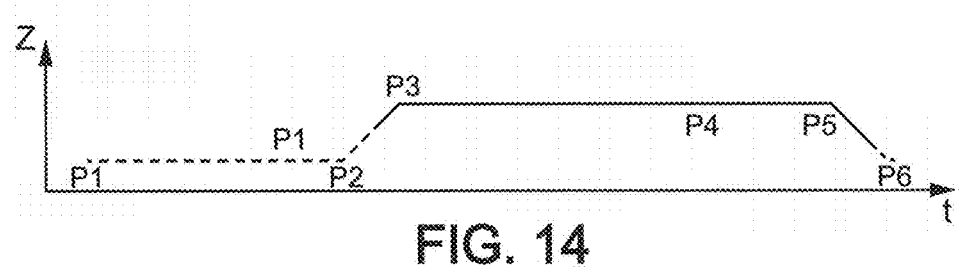
FIG. 14 is a graph illustrating the path of the robotic comb in the vertical direction during implementation of a method according to the invention.

Such a first path segment P1-P2 of the robotic comb 10 is thus part of an inactive path segment of the robotic comb 10, illustrated in dotted lines in FIGS. 12 to 14, meaning a path segment in which the robotic comb is not carrying any items A.

Advantageously, when the incoming batch carrier 2 is received in a tool of a production line, movement of the robotic comb 10 can be synchronized with said tool.

For example, in the embodiment of FIG. 4, where the incoming batch carrier 2 comprises a plurality of pot supports 3 that are part of a cutting tool 4 in a production line, movements along the vertical axis of the lower die 27, the upper portion 28, and/or the pot supports 3, are synchronized with the movement of the robotic comb so that the lower die 27 and the upper portion 28 are vertically distant from the items A and said items can be moved in the horizontal plane without coming into contact with the lower die 27 and upper portion 28.

Then, in a second path segment P2-P3 of the robotic comb 10, the movement means 13 lift the robotic comb 10 vertically, relative to the horizontal incoming batch carrier 2, while keeping the robotic comb 10 horizontal, so as to come into contact with the items A of the incoming batch L and raise them from the incoming batch carrier 2.

In this manner, the plurality of items A of the incoming batch L are moved simultaneously in the vertical direction Z, while the items A are kept stationary in the horizontal plane H relative to the incoming batch carrier 2. The robotic comb 10 is moved until the items A are no longer in contact with the incoming batch carrier 2 and are free to be moved in the horizontal plane H without touching the incoming batch carrier 2.

"The items are moved simultaneously in the vertical direction" is understood to mean that all items A of the incoming batch are moved simultaneously, meaning that the items have a zero relative velocity to one another.

In the case where the incoming batch carrier 2 comprises pot supports 3 and the items A of the incoming batch L are accommodated in pot supports 3, the movement means 13 for the robotic comb 10 lift the items A vertically until said items A have fully exited the pot supports 3.

To achieve movement of the robotic comb 10 in the vertical direction Z, the movement means 13 may comprise means 14 adapted to move the robotic comb 10 in the vertical direction Z with the fingers 11 of the horizontal comb. These means 14 comprise for example an eccentric assembly driven by a motor.

In a second embodiment of the invention, to move the plurality of items A of the incoming batch L in the vertical direction Z with respect to the incoming batch carrier 2, while keeping the items A immovable relative to the incoming batch carrier in the horizontal plane H, the incoming batch carrier 2 on or in which are arranged the items A is vertically lowered, with respect to the 10 horizontal robotic comb, while said incoming batch carrier 2 is kept horizontal, such that the items A of the incoming batch L come to rest on the robotic comb 10 and in particular on the longitudinal fingers 11 of the robotic comb 10.

The incoming batch carrier 2 is then lowered in the vertical direction Z, by a distance sufficient for the items A to no longer be in contact with the incoming batch carrier 2 and to be free to be moved in the horizontal plane H without touching the incoming batch carrier 2.

In this second embodiment of the invention, to achieve the movement of the incoming batch carrier 2 in the vertical direction Z, said carrier may comprise suitable movement means, for example a hydraulic cylinder, a rack and pinion, or an eccentric assembly driven by a motor.

Note that in various embodiments of the invention, to move the items A of the incoming batch L, the only contact with the items A is from below, in the vertical direction Z. More specifically, it may be arranged so that there is contact with the upper portion A2 of the items A from below, the lower portion A1 being surrounded transversely.

The fact that the items A remain immovable in the horizontal plane H in relation to the incoming batch carrier 2, as they are moved in the vertical direction Z, ensures that the relative orientation and relative position of the items A of the incoming batch L are maintained. Indeed, a horizontal movement of the items A in contact with the incoming batch carrier 2 would result in a significant risk of said items being rotated and/or shifted in the longitudinal direction X and/or possibly in the transverse direction Y.

Generally, in various embodiments of the invention, the relative movement of the robotic comb and incoming batch carrier can be controlled so that they have a vertical relative velocity of less than 200 millimeters per second when contact occurs between the robotic comb and the items A of the incoming batch L. In this manner, the intensity of the impact when contact occurs between the robotic comb and the items A is reduced and unwanted movement of the items A, such as bouncing, is prevented.

Once the items A are no longer in contact with the incoming batch carrier 2 and are free to be moved in the horizontal plane H without touching said incoming batch carrier 2, the captured items A are brought to directly above the horizontal conveyor belt 6, the items A being vertically distanced from said conveyor belt 6 by a predefined vertical spacing E.

Figure 9:
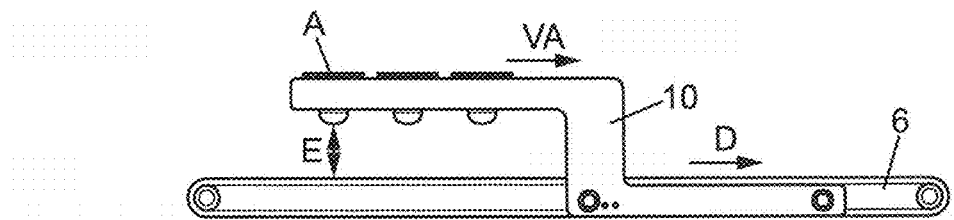
FIG. 9 is a partial side view of the machine, the robotic comb having captured the items and brought them to directly above the conveyor belt.
Figure 10:
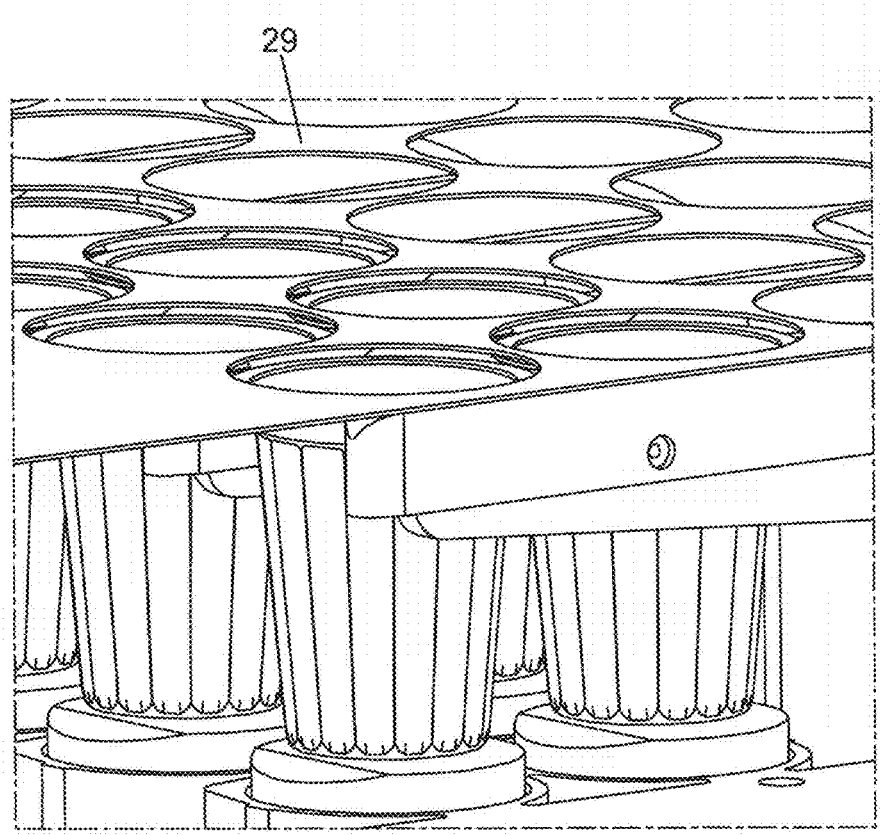
FIG. 10 is a detail perspective view of the upstream portion of the machine, illustrating the plastic cutout scrap as well as the longitudinal fingers of the robotic comb, and in particular the structures of the upper face of the longitudinal fingers supporting, and keeping the items away from, the plastic cutout scrap.

For this purpose, the movement means 13 for the robotic comb 10 move the robotic comb 10 in a third path segment P3-P4 in order to bring the items A to directly above the conveyor belt 6 as shown in FIG. 9.

At the end of the third path segment, at P4, the robotic comb is then in the position indicated by reference 10' in FIGS. 1 to 3.

The third path segment P3-P4 is an active path segment, meaning that the items A are arranged on the robotic comb 10, illustrated in solid lines in FIGS. 12 to 14. The items A are in particular supported only by the robotic comb 10.

Movement of the robotic comb 10 along the third path segment may be only a movement in the horizontal plane H, in particular a movement in the longitudinal direction X. For this purpose, the movement means 13 for the robotic comb 10 may include means 15 adapted to move the robotic comb 10 in the longitudinal direction X, for example a linear motor, in particular a linear motor in the form of a magnetic actuator.

In one embodiment of the invention, the means 14 adapted to move the robotic comb 10 in the vertical direction Z and the means 15 adapted to move the robotic comb 10 in the longitudinal direction X may be coupled and synchronized so that drift of one of the means 14, 15 is compensated for by movement of the other means 14, 15.

In one embodiment of the invention, the longitudinal fingers 11 of the robotic comb 10 each have an upper face 11a provided with a plurality of structures 11b, for example notches or structures of increased thickness. The structures 11b are for example distributed along the longitudinal direction X of the longitudinal fingers 11 and are adapted to wedge the captured items A in place in the horizontal plane H during movement of the robotic comb 10 in the horizontal plane H.

In the embodiment wherein the incoming batch carrier 2 is adapted to be received in a cutting tool 4, the structures 11b of the upper face 11a may be adapted to support the items A and keep them away from cutting waste such as the plastic cutout scrap, in particular when the items A are captured by the robotic comb 10 and brought to directly above the conveyor belt 6.

Figure 15:
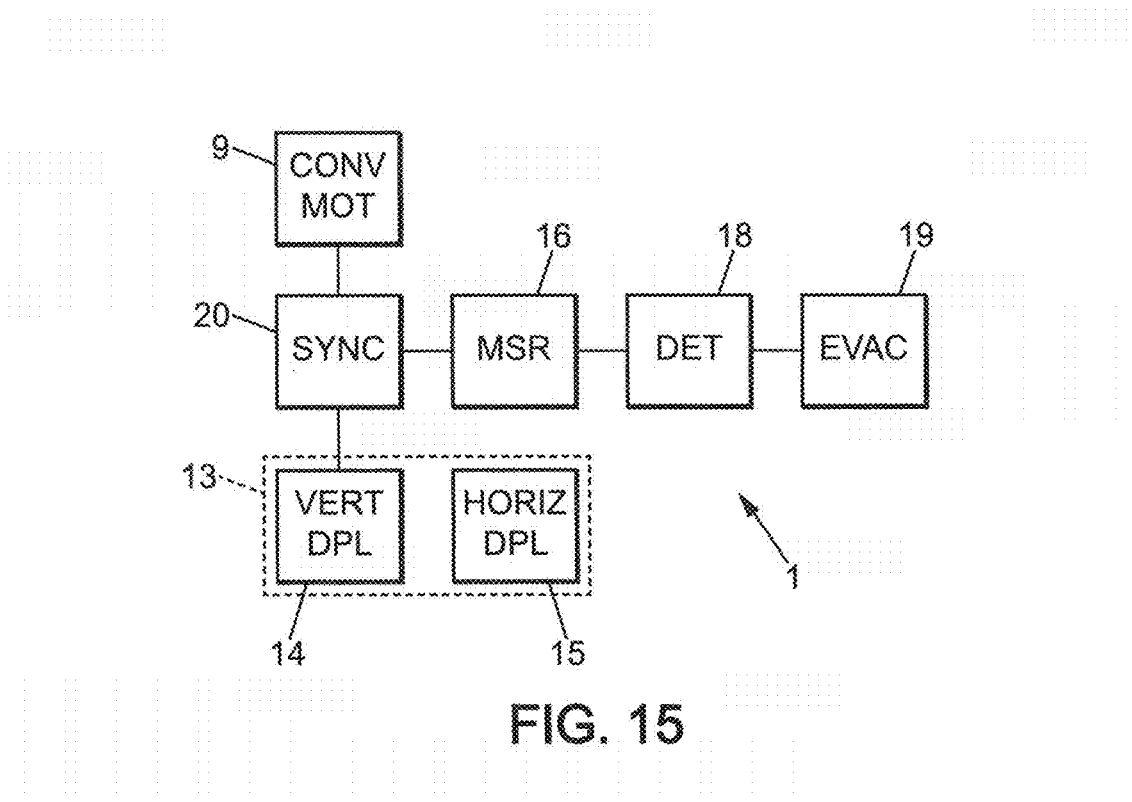
FIG. 15 is a flow chart of one embodiment of a machine according to the invention.

Referring to FIG. 15, in one embodiment of the invention, when the captured items A are being brought to directly above the conveyor belt 6, at least one physical characteristic of the captured items A is measured by means 16 for measuring said at least one physical characteristic.

The physical characteristic of the items A may, for example, be a weight of the items, an optical measurement of the outer surface of the items, a measurement of the presence or absence of a portion of the items A. The measurement means 16 may thus be an optical sensor, a force sensor, a magnetic sensor, or some other means, depending on the physical characteristic to be measured.

From the measured physical characteristic, determination means 18 can then determine the presence or absence of defective items among the captured items. If the presence of defective items among the captured items A is determined, the captured items A may be eliminated by means for discharging defective items detected 19.

The means of eliminating defective items detected 19 may be placed downstream of the conveying machine 1 and may comprise a gripping machine suitable for gripping the defective items in the batch of outgoing items S, these being identified by their horizontal position relative to the conveyor belt 6 as detailed below.

Alternatively, a discharge outlet 17 may for example be arranged, in the horizontal plane, between the conveyor belt 6 and the incoming batch carrier 2 as illustrated in FIGS. 1 and 2. A collection bin may be placed in the discharge outlet 17 to collect items eliminated through the discharge outlet 17. The means for eliminating defective items detected 19 may be able to discharge the defective items detected or in particular all captured items A, via the discharge outlet 17, when the presence of defective items among the captured items A is determined.

For this purpose, the movement means 13 for the robotic comb 10 may for example position the robotic comb 10 so that the upstream end of the robotic comb 10 is placed above the discharge outlet 17, if applicable near the downstream end of the discharge outlet 17. Then, the means for eliminating defective items detected 19 can sweep the items A placed on the robotic comb 10 so that they fall into the discharge outlet 17.

The machine 1 further comprises adjustment and synchronization means 20, in particular downstream, indicated in FIG. 15. The adjustment and synchronization means 20 are adapted to control the movement means 13 for the robotic comb 10. The adjustment and synchronization means 20 comprise, for example, a circuit board and/or a microcomputer or microcontroller and/or conveyor belt speed sensors.

Specifically, as the captured items A are directly above the conveyor belt 6, the adjustment and synchronization means 20 are suitable for adjusting and synchronizing, with the movement speed V of the conveyor belt 6, a horizontal movement Va of the items A brought to directly above the conveyor belt.

The conveyor belt 6 is such that said conveyor belt is moving at movement speed V when the captured items A are brought to directly above the conveyor belt 6.

"Adjusting and synchronizing, with the movement speed of the conveyor belt, a horizontal movement of the items" is therefore understood to mean adjusting the direction and speed, in the horizontal plane, of the items so that they are identical to the speed and direction of travel of the conveyor belt, such that the items are immovable relative to the conveyor belt in the horizontal plane.

To this end, the adjustment and synchronization means 20 may further be connected to the motor 9 driving the conveyor belt 6, or to a movement speed sensor of the conveyor belt 6, to permit fine-tuned adjustment of the movement speed of the captured items A, meaning the movement speed of the robotic comb 10, to the movement speed of the conveyor belt 6.

It is therefore understood that the robotic comb 10 is then moved along a fourth path segment P4-P5 that is part of the active path segment, and in which the movement speed of the robotic comb 10 in the horizontal plane H is synchronized with the movement speed V of the conveyor belt.

Furthermore, when adjusting and synchronizing the horizontal movement of the items A to the movement speed V of the conveyor belt 6, one may further define a horizontal position of the items A of the batch of outgoing items S with respect to the conveyor belt 6, in particular a horizontal position defined along the direction of travel D of the conveyor belt.

Here, the term "define a horizontal position" is understood to mean either that a predefined horizontal position is imposed on the items A relative to the conveyor belt 6, or that the horizontal position of the items A relative to the conveyor belt 6 is identified and stored. The horizontal position of the items A of the batch of outgoing items S relative to the conveyor belt 6 is thus known, which facilitates the operations of the production line downstream of the conveying machine or method.

It is particularly advantageous to have a defined horizontal position of the items A of the batch of outgoing items S relative to the conveyor belt 6 when the movement speed V of the conveyor belt is not constant. In this case, it is then easy to identify the items A downstream of the conveying machine, which simplifies downstream operations in the production line.

Once the movement speed of the robotic comb 10 in the horizontal plane H is synchronized with the movement speed of the conveyor belt, the movement means 13 for the robotic comb 10 are then used to move all the items A simultaneously in the vertical direction Z, in order to place the items A on the conveyor belt 6.

To do so, the robotic comb 10 is moved along a fifth path segment P5-P6 that is part of an active path segment. The robotic comb 10 is vertically lowered along the vertical direction Z with respect to the fixed conveyor belt 6, by means 14 able to move the robotic comb 10 along the vertical direction Z while keeping the horizontal movement of the items A synchronized with the movement speed V of the conveyor belt 6 due to the means 15 controlling the robotic comb 10 in the longitudinal direction X.

Figure 11:
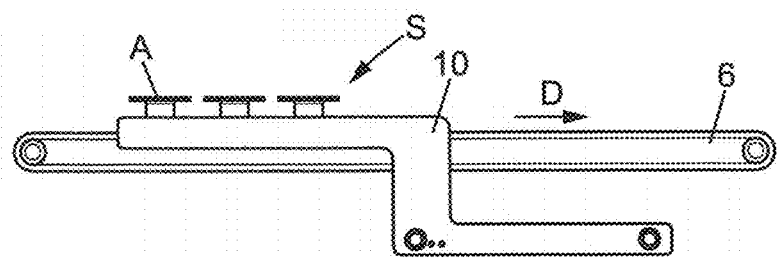
FIG. 11 is a partial side view of the machine, the robotic comb having moved the items brought to directly above the conveyor belt so that they rest on the conveyor belt.

The robotic comb 10 is lowered vertically in this manner, for a distance sufficient to bring the items A to rest on the conveyor belt 6 as shown in FIG. 11. Thus, in particular, the means 14 adapted to move the robotic comb 10 along the vertical direction Z can lower the robotic comb 10 vertically, relative to the conveyor belt 6, along a vertical distance greater than the predetermined vertical spacing E, such that the items A lose contact with the robotic comb 10 at the end of said vertical distance, in particular lose contact with the robotic comb 10, by a relative movement of the items and robotic comb 10 that has only a vertical component.

In this manner, the items A are deposited on the conveyor belt 6 with zero horizontal velocity relative to the conveyor belt 6 and with zero horizontal velocity relative to the robotic comb 10. Here also, the fact that the items A are kept immovable relative to the conveyor belt 6 and to the robotic comb 10, in the horizontal plane H, as they are moved in the vertical direction Z, ensures that the relative orientation and relative position of the items A are preserved. Indeed, a horizontal movement of the items A in contact with the conveyor belt 6 and/or in contact with the robotic comb 10 would result in a high risk of said items rotating and/or shifting in the longitudinal direction X and/or possibly in the transverse direction Y.

In this manner, the items in the batch of outgoing items S advantageously have, in the horizontal plane H, the same relative orientations and the same relative positions as the items in the incoming batch L. It is therefore unnecessary to reposition the items A later in the production line.

To permit said movement of the robotic comb 10 along a vertical distance greater than the predefined vertical spacing E, the conveyor belt may advantageously comprise a plurality of conveying strands 7, as described above. Each conveying strand 7 may be associated with a single longitudinal column C of items A, captured and supported between two adjacent longitudinal fingers 11 of the comb 10.

The conveying strands 7 may be aligned at a predetermined transverse pitch Py, in the transverse direction Y, identical to the transverse pitch of the longitudinal fingers 11 and thus in particular identical to the pitch of the items A arranged on or in the incoming batch carrier 2. The conveying strands 7 may be spaced apart from each other along the transverse direction Y by transverse strand spaces Eb. The transverse strand spaces Eb advantageously have a width, in the transverse direction Y, that is greater than the respective transverse spaces of the fingers Ed. In this manner, the transverse strand spaces Eb are adapted to accommodate the longitudinal fingers 11 of the robotic comb 10. This allows the longitudinal fingers 11 of the robotic comb 10 to be lowered below the level of the conveying strands 7 of the conveyor belt 6.

Once the robotic comb 10 is no longer in contact with the items A, they are then moved by the conveyor belt 6 and are discharged as a batch of outgoing items S, in particular by a translational motion in the direction of travel of the conveyor belt as shown in FIG. 11.

In addition, the longitudinal fingers 11 of the robotic comb 10 may provide a supplemental guide function. When the items A are discharged as a batch of outgoing items S by means of the conveyor belt 6, the longitudinal columns C formed by the items A are guided on the conveyor belt 6 by means of the longitudinal fingers 11 of the robotic comb 10 which are transversely surrounding the items A. The longitudinal fingers 11 are thus adapted to guide the items A in the direction of travel D in the horizontal plane H, as the discharging of the items A on the conveyor belt 6 begins.

Finally, in a sixth path segment P0-P1 the robotic comb is moved in the horizontal plane H along the longitudinal direction X, to return from downstream to upstream, in particular via means 15 able to move the robotic comb 10 in the longitudinal direction X.

The sixth path segment thus is part of an inactive path segment of the robotic comb 10, illustrated with dotted lines in FIGS. 12 to 14, meaning a path segment in which the robotic comb does not perform any item A conveying function.

Thus, in the various path segments, the robotic comb is at least partly moved by the means 15 able to move the robotic comb 10 in the longitudinal direction X. The robotic comb can thus be moved along an active path segment at a first movement speed V1 in the horizontal plane H, said active path segment including for example the third path segment P3-P4 and/or the fourth path segment P4-P5 described above. The robotic comb may also be moved along an inactive return path segment at a second movement speed V2 in the horizontal plane, for example along the sixth path segment P0-P1 described above.

Advantageously, as illustrated in FIG. 13, the second movement speed may be greater than the first movement speed. In this manner, overflow of the item content onto the exterior or as a dribble on the inside of the lid can be avoided while maintaining a significant speed in conveying the items A.

Moreover, advantageously, the movement speed of the robotic comb along the third path segment P3-P4 may be greater than the movement speed V of the conveyor belt 6. In this manner, the movement speed of the robotic comb is decreased in order to synchronize it with the movement speed of the conveyor belt along the fourth path segment P4-P5.

In one embodiment of the invention, the steps of the method and therefore the path of the robotic comb described above are repeated a plurality of times. In particular, one or more elements among the following may be synchronized: the path of the robotic comb 10, the arrival of the incoming batches L of items, the longitudinal pitch Px of the rows of items A in the incoming batches L, and the movement speed V of the conveyor belt 6; so as to ensure, on the conveyor belt 6, a stream of outgoing items A containing rows of items A transverse to the direction of travel D of the conveyor belt 6, that are regularly spaced apart by a predefined longitudinal pitch.

The predefined longitudinal pitch between the rows of items A in the stream of outgoing items A may be constant or may be varied in order to manage the spacing between items on the conveyor and/or to respond to upstream and/or downstream dependency constraints in the production line.

The robotic comb 10 therefore travels the closed path P0-P6 detailed above, a plurality of times.

In this manner, a steady stream of items A on the conveyor belt 6 is obtained, which further simplifies the identification of positions of the items A downstream of the conveying machine in the production line. Furthermore, there may be a defined horizontal position of the items A in the batch of outgoing items S relative to the conveyor belt 6, which facilitates downstream management of items A in the outgoing batch, particularly in the case where the movement speed V of the conveyor belt 6 is not constant.

The invention claimed is:

1. A method for conveying items in a production line, comprising:
   providing an incoming batch of items, the batch having a plurality of separate items placed on or in an incoming batch carrier so as to be aligned within a horizontal plane in one or a plurality of longitudinal columns and/or one or more transverse rows;
   moving the plurality of items in the incoming batch relative to the incoming batch carrier, simultaneously, in a vertical direction perpendicular to the horizontal plane, while keeping the items immovable relative to the incoming batch carrier in the horizontal plane, so that the items are no longer in contact with the incoming batch carrier and are free to be moved in the horizontal plane without touching the incoming batch carrier;
   bringing the items to directly above a horizontal conveyor belt, the items being vertically distanced from said conveyor belt by a predefined vertical spacing;
   moving the items in the vertical direction, simultaneously, to bring the items to rest on the conveyor belt; and
   discharging the items in a batch of outgoing items by means of the conveyor belt,
   wherein:
   when the items are brought to directly above the conveyor belt, the conveyor belt has a movement in a movement direction in the horizontal plane at a movement speed,
   as the items are vertical to the conveyor belt, a horizontal movement of the items is adjusted and is synchronized with said movement speed of the conveyor belt, and
   the items are moved in the vertical direction to bring the items to rest on the conveyor belt while keeping the horizontal movement of the items synchronized with the movement speed of the conveyor belt.

2. The method according to claim 1, wherein the items of the incoming batch are arranged on or in the incoming batch carrier, in regularly aligned longitudinal columns so as to a have a predefined transverse pitch in a transverse direction in the horizontal plane and to be spaced apart from each other in said transverse direction by transverse gripping spaces.

3. The method according to claim 2, wherein, in order to move the plurality of items of the incoming batch, simultaneously, in the vertical direction, longitudinal fingers of a robotic comb are introduced into the transverse gripping spaces of the incoming batch, said longitudinal fingers being regularly aligned so as to provide said predefined transverse pitch, and being arranged so that two adjacent longitudinal fingers are able to surround transversely the items of a longitudinal column of items of the incoming batch and to support the items of said longitudinal column in order to capture them and carry them to directly above the conveyor belt.

4. The method according to claim 1, wherein the items comprise at least a lower extension portion and an upper portion, the upper portion having a transverse dimension greater than a transverse dimension of the lower extension portion, and that, in order to move the items of the incoming batch in a vertical direction, contact is made with the upper portion from below while transversely surrounding the lower portion.

5. The method according to claim 4, wherein the items comprise a body with a bottom wall, a side wall closed on itself, a top closure, and a flange near the top closure, said body constituting the lower extension portion, said flange constituting the upper portion.

6. The method according to claim 1, wherein there is contact with the items only from below, in a vertical direction.

7. The method according to claim 1, wherein, in order to move the items of the incoming batch in a vertical direction, a robotic comb is raised vertically, relative to the horizontal incoming batch carrier, while keeping the robotic comb horizontal, so as to come to contact with, and lift from the incoming batch carrier, the items of the incoming batch.

8. The method according to claim 1, wherein, in order to move the items of the incoming batch in a vertical direction, the incoming batch carrier on or in which are arranged the items is vertically lowered with respect to a horizontal robotic comb, while said incoming batch carrier is kept horizontal, so that the items of the incoming batch come to rest on the robotic comb.

9. The method according to claim 1, wherein, in order to move the items of the incoming batch in a vertical direction, a robotic comb and/or the incoming batch carrier are moved so that the robotic comb and the incoming batch carrier have a vertical relative velocity that is less than 200 millimeters per second upon contact between the robotic comb and the items of the incoming batch.

10. The method according to claim 1, wherein a robotic comb is moved,
    along an active path segment in order to bring the items to directly above the conveyor belt, at a first movement speed in the horizontal plane, and
    along an inactive return path segment, wherein the robotic comb provides no item carrying function, at a second movement speed in the horizontal plane that is greater than the first movement speed.

11. The method according to claim 1, wherein, in order to move the items in the vertical direction so that the items are brought to rest on the conveyor belt, a robotic comb is lowered vertically relative to the fixed conveyor belt, so that the items come to rest on the conveyor belt.

12. The method according to claim 11, wherein, in order to bring the items to rest on the conveyor belt, the robotic comb is vertically lowered relative to the conveyor belt along a vertical travel distance greater than the predefined vertical spacing, so that the items lose contact with the robotic comb at the end of said vertical travel.

13. The method according to claim 1, wherein, in order to discharge the items in a batch of outgoing items by means of the conveyor belt, the items are guided on the conveyor belt in the movement direction of the horizontal plane, by means of longitudinal fingers of a robotic comb transversely surrounding the items.

14. The method according to claim 1, wherein a robotic comb is moved only in the vertical direction and in a horizontal direction, the horizontal direction being the travel direction of the conveyor belt.

15. The method according to claim 1, wherein, when the items are brought to directly above the conveyor belt, at least one physical characteristic of the items is measured.

16. The method according to claim 15, wherein
    the presence or absence of defective items among the items is determined, based on the measured physical characteristic, and
    if the presence of defective items among the items is determined, the items are discharged.

17. The method according to claim 1, wherein the items of the batch of outgoing items have, in the horizontal plane, the same relative orientations and the same relative positions as the items of the incoming batch.

18. The method according to claim 1, wherein, when adjusting and synchronizing a horizontal movement of the items to the movement speed of the conveyor belt, a horizontal position of the items of the batch of outgoing items is defined relative to the conveyor belt, a horizontal position along the direction of travel of the conveyor belt.

19. The method according to claim 1, wherein, when the items are brought to directly above a horizontal conveyor belt, said items are vertically apart from the cutting waste from the items so that said cutting waste from items does not come into contact with the items.

20. The method according to claim 1, wherein the steps of the method are repeated a plurality of times so as to ensure, on the conveyor belt, a flow of outgoing items comprising rows of items, transverse to the direction of travel of the conveyor belt, regularly spaced apart by a predefined longitudinal pitch, the items being arranged in one or more columns.

21. A machine for conveying items in a production line, which comprises:
upstream of the production line, an incoming batch carrier on or in which are arranged a plurality of separate items of an incoming batch of items so as to be aligned within a horizontal plane in one or more longitudinal columns and/or one or more transverse rows,
downstream of the production line, a horizontal conveyor belt for discharging the items in a batch of outgoing items,
upstream of the production line, means for moving the plurality of items of the incoming batch, simultaneously, in a vertical direction perpendicular to the horizontal plane, while keeping the items immovable in the horizontal plane relative to the incoming batch carrier, so that items are no longer in contact with the incoming batch carrier and are free to be moved within the horizontal plane without touching the incoming batch carrier,
downstream of the production line, means for bringing the items to directly above the conveyor belt, the items being vertically distant from said conveyor belt by a predefined vertical spacing,
downstream of the production line, means for moving the items in the vertical direction, simultaneously, in order to bring the items to rest on the conveyor belt,
wherein
the conveyor belt has movement in a direction of travel in the horizontal plane at a movement speed at least when the items are brought to directly above the conveyor belt,
the machine further comprises, downstream of the production line, means for adjustment and synchronization with the movement speed of the conveyor belt, of a horizontal movement of the items brought to directly above the conveyor belt, and
means for moving the items in the vertical direction in order to bring the items to rest on the conveyor belt are adapted to move said items in the vertical direction while keeping the horizontal movement of the items synchronized with the movement speed of the conveyor belt.

22. The machine according to claim 21, wherein the means for bringing the items to directly above the conveyor belt comprise a robotic comb and means for moving the robotic comb.

23. The machine according to claim 22, wherein the robotic comb is provided with longitudinal fingers regularly aligned so as to have a predefined transverse pitch in a transverse direction of the horizontal plane that is perpendicular to the direction of travel of the conveyor belt, and arranged such that two adjacent longitudinal fingers are adapted to surround transversely the items of a longitudinal column of items of the incoming batch and to support the items of said longitudinal column so as to capture them and carry them to directly above the conveyor belt.

24. The machine according to claim 23, wherein the incoming batch carrier comprises a plurality of longitudinal grooves regularly aligned at a predefined transverse pitch in a transverse direction in the horizontal plane that is perpendicular to the direction of travel of the conveyor belt, said longitudinal grooves being adapted to accommodate the longitudinal fingers of the robotic comb.

25. The machine according to claim 23, wherein the conveyor belt comprises a plurality of conveying strands, synchronized, aligned at a predefined transverse pitch in a transverse direction perpendicular to the direction of travel of the conveyor belt, and spaced apart from each other in the transverse direction by transverse strand spaces adapted to accommodate the longitudinal fingers of the robotic comb.

26. The machine according to claim 23, wherein the longitudinal fingers of the robotic comb each have an upper face provided with a plurality of structures distributed along the longitudinal direction of the longitudinal fingers.

27. The machine according to claim 23, wherein the robotic comb comprises a frame on which are mounted the longitudinal fingers and a comb body integral with movement means, the frame and the comb body being secured together by detachable assembly means.

28. The machine according to claim 27, wherein the detachable assembly means are magnetic assembly means comprising a first member mounted on the comb body and a second member mounted on the frame, the detachable assembly means being adapted to secure the frame to the comb body in a manner that is detachable in response to a force sufficiently strong to overcome a predefined magnetic attraction between the first member and the second member.

29. The machine according to claim 22, wherein the means for moving the robotic comb comprise means for moving the robotic comb in a horizontal direction, controlled by the means for adjustment and synchronization with the movement speed of the conveyor belt, said means for moving the robotic comb comprising a linear motor or a magnetic actuator.

30. The machine according to claim 23, wherein the means for moving the robotic comb comprise means for moving the robotic comb in the vertical direction which are capable of moving the robotic comb while keeping the longitudinal fingers of the robotic comb horizontal, said means for moving the robotic comb comprising an eccentric assembly.

31. The machine according to claim 21, further comprising means for measuring at least one physical characteristic of the items.

32. The machine according to claim 31, further comprising determination means capable of determining the presence or absence of defective items among the captured items based on said physical characteristic of the items and means for discharging the defective items detected.

33. The machine according to claim 32, wherein the means for discharging defective items detected comprise a discharge outlet between the conveyor belt and the incoming batch carrier, in the horizontal plane, the means for discharging the defective items detected being capable of discharging through the discharge outlet the defective items.

34. The machine according to claim 21, wherein the incoming batch carrier comprises a plurality of pot supports of a cutting tool of a production line.

35. The machine according to claim 26, wherein the plurality of structures is adapted to distance the items vertically from item cutting waste, during movement of the robotic comb.

* * * * *